US008842904B2

(12) United States Patent
Chen

(10) Patent No.: US 8,842,904 B2
(45) Date of Patent: Sep. 23, 2014

(54) METHOD FOR TOOTH DISSECTION IN CBCT VOLUME

(75) Inventor: Shoupu Chen, Rochester, NY (US)

(73) Assignee: Carestream Health, Inc., Rochester, NY (US)

(*) Notice: Subject to any disclaimer, the term of this patent is extended or adjusted under 35 U.S.C. 154(b) by 0 days.

(21) Appl. No.: 13/448,466

(22) Filed: Apr. 17, 2012

(65) Prior Publication Data

US 2013/0022254 A1 Jan. 24, 2013

Related U.S. Application Data

(63) Continuation-in-part of application No. 13/187,596, filed on Jul. 21, 2011.

(51) Int. Cl.
*G06K 9/00* (2006.01)
*G06K 9/34* (2006.01)
*G06T 7/00* (2006.01)

(52) U.S. Cl.
CPC .......... *G06K 9/34* (2013.01); *G06T 2207/10081* (2013.01); *G06T 2207/20096* (2013.01); *G06T 7/0089* (2013.01); *G06T 7/0083* (2013.01); *G06T 2207/30036* (2013.01)
USPC ........................................................ 382/154

(58) Field of Classification Search
USPC ........................................................ 382/154
See application file for complete search history.

(56) References Cited

U.S. PATENT DOCUMENTS

| | | | |
|---|---|---|---|
| 5,431,562 A | 7/1995 | Andreiko et al. | |
| 6,210,162 B1 | 4/2001 | Chishti et al. | |
| 6,409,504 B1 | 6/2002 | Jones et al. | |
| 7,317,819 B2 | 1/2008 | Janes | |
| 7,324,661 B2 | 1/2008 | Kemp et al. | |
| 7,460,709 B2 | 12/2008 | Grady | |
| 8,244,017 B2 | 8/2012 | Chun et al. | |
| 8,253,778 B2 | 8/2012 | Atsuski | |
| 8,594,428 B2 | 11/2013 | Aharoni et al. | |
| 8,605,973 B2 | 12/2013 | Wang et al. | |
| 8,761,493 B2 | 6/2014 | Chen et al. | |
| 2003/0039389 A1 | 2/2003 | Jones et al. | |
| 2004/0175671 A1 | 9/2004 | Jones et al. | |
| 2004/0227750 A1 | 11/2004 | Su et al. | |

(Continued)

FOREIGN PATENT DOCUMENTS

WO  WO 2008/092009  7/2008

OTHER PUBLICATIONS

Krsek et al., "Teeth and jaw 3D reconstruction in stomatology", *Proceedings of the International Conference on Medical Information Visualisation—BioMedical Visualisation*, pp. 23-28, 2007.

(Continued)

*Primary Examiner* — Alex Liew

(57) ABSTRACT

A method of generating a dissection curve between a first and a second object in a volume image. The method accesses volume image data of a subject as a set of image slices and identifies a region of the volume image data that includes at least the first and second objects. At least one starting point in the volume image data is defined for the dissection curve according to a geometric primitive entered by an operator. Successive dissection curve points are identified according to points of minimum intensity in successive image slices. The dissection curve that connects the identified plurality of successive dissection curve points is displayed.

15 Claims, 15 Drawing Sheets

(56) References Cited

U.S. PATENT DOCUMENTS

| 2006/0029275 | A1 | 2/2006 | Li et al. |
|---|---|---|---|
| 2006/0147872 | A1 | 7/2006 | Andreiko |
| 2006/0227131 | A1 | 10/2006 | Schiwietz et al. |
| 2007/0127801 | A1 | 6/2007 | Kalke |
| 2008/0118143 | A1* | 5/2008 | Gordon et al. ............... 382/154 |
| 2008/0136820 | A1 | 6/2008 | Yang et al. |
| 2008/0232539 | A1 | 9/2008 | Pasini et al. |
| 2008/0310716 | A1 | 12/2008 | Jolly et al. |
| 2009/0003672 | A1 | 1/2009 | Maier et al. |
| 2009/0097727 | A1 | 4/2009 | Jolly et al. |
| 2010/0278299 | A1 | 11/2010 | Loustauneau et al. |

OTHER PUBLICATIONS

Shah et al. "Automatic tooth segmentation using active contour without edges", 2006, IEEE Biometrics Symposium, 6 pages.

Akhoondali et al., "Rapid Automatic Segmentation and Visualization of Teeth in CT-Scan Data", *Journal of Applied Sciences*, pp. 2031-2044, 2009.

Gao et al., "Automatic Tooth Region Separation for Dental CT Images", *Proceedings of the 2008 Third International Conference on Convergence and Hybrid Information Technology*, pp. 897-901, (2008).

M. Sadeghi, G. Tien, G. Hamarneh, M.S. Atkins, "Hands-free Interactive Image Segmentation Using Eyegaze", SPIE Medical Imaging 2009, vol. 7260, pp. H1-H10.

Marie-Pierre Jolly, Leo Grady, "3D general lesion segmentation in CT", ISBI 2008, pp. 796-799.

Vladimir Vezhnevets, and Vadim Konouchine ,"GrowCut—Interactive Multi-Label N-D Image Segmentation by Cellular Automata," *Int'l Conf. Computer Graphics and Vision 2005*, 7 pages.

R.L. Graham, "An Efficient Algorithm for Determining the Convex Hull of a Finite Planar Set", Jan. 28, 1972, Information Processing Letters 1 (1972) pp. 132-133, North-Holland Publishing Company.

Hong Chen, et al., "Tooth Contour Extraction for Matching Dental Radiographs," Pattern Recognition, 2004 ICPR 2004 Proceedings of the 17th International Conference, 4 pages.

T.K. Schleyer, et al., "A Preliminary Analysis of the Dental Informatics Literature," Adv Dent Res, 17, pp. 20-24, Dec. 2003.

S.Y.Lee, et al., "Development of a Digital Panoramic X-ray Imaging System for Dental Applications," 2007 IEEE Nuclear Science Symposium Conference Record, vol. 4, pp. 2987-2990.

International Search Report mailed Jan. 30, 2013 for International Application No. PCT/US2012/047268, 3 pages.

International Search Report mailed Oct. 30, 2012 for International Patent Application No. PCT/US2012/047265, 11 pages.

Sinop et al., "A Seeded Image Segmentation Framework Unifying Graph Cuts and Random Walker which Yields a New Algorithm," ICCV, 2007, pp. 1-8.

\* cited by examiner

METHOD FOR TOOTH DISSECTION IN CBCT VOLUME

CROSS REFERENCE TO RELATED APPLICATIONS

This application is a Continuation-in-Part of commonly assigned copending U.S. patent application U.S. Ser. No. 13/187,596 filed on Jul. 21, 2011 entitled "METHOD AND SYSTEM FOR TOOTH SEGMENTATION IN DENTAL IMAGES" to Chen et al.

FIELD OF THE INVENTION

The present invention relates generally to image processing in x-ray computed tomography and, in particular, to three dimensional tooth dissection and segmentation in a digital CBCT volume.

BACKGROUND OF THE INVENTION

Schleyer et al. ("A Preliminary analysis of the dental informatics literature", *Adv. Dent Res* 17:20-24), indicates a rise in the number of dental informatics papers in journals such as *Journal of the American Medical Informatics Association*, the *Journal of the American Dental Association*, and the *Journal of Dental Education*.

Image segmentation is of benefit for dental applications such as computer aided design, diagnosis, and surgery. Various approaches have been proposed in recent years to address tooth segmentation. However, a number of researchers indicate a difficulty of tooth segmentation. For example, researcher Shah describes a method for automating identification of deceased individuals based on dental characteristics in comparing post-mortem images with tooth images in multiple digitized dental records ("Automatic tooth segmentation using active contour without edges", 2006, *Biometrics Symposium*). One step in such a method is the estimation of the contour of each tooth in order to allow more efficient feature extraction. Extracting the contour of the tooth, however, proves to be a challenging task. In Shah's method, the task of tooth contour estimation is attempted using active contour without edges. This technique is based on the intensity of the overall region of the tooth image. Still other attempts, such as those described by Krsek et al. in the article "Teeth and jaw 3D reconstruction in stomatology" (*Proceedings of the International Conference on Medical Information Visualisation—BioMedical Visualisation*, pp 23-28, 2007); Akhoondali et al. in "Rapid Automatic Segmentation and Visualization of Teeth in CT-Scan Data", *Journal of Applied Sciences*, pp 2031-2044, (2009); and Gao et al. in "Tooth Region Separation for Dental CT Images", *Proceedings of the 2008 Third International Conference on Convergence and Hybrid Information Technology*, pp 897-901, (2008) fall short of what is needed to address the problem of tooth separation or dissection and segmentation and provide robust, repeatable performance.

Thus, it is seen that there is a need for a method that provides a better solution for teeth dissection without cutting through the teeth region of interest in a three dimensional dental image volume for tooth segmentation.

SUMMARY OF THE INVENTION

It is an object of the present invention to advance the art of tooth dissection in individual teeth segmentation using cone beam CT images. With this object in mind, the present invention provides a method of generating a dissection curve between a first and a second object in a volume image, the method executed at least in part on a computer and comprising: accessing volume image data of a subject as a set of image slices; identifying a region of the volume image data that includes at least the first and second objects; defining at least one starting point in the volume image data for the dissection curve according to a geometric primitive entered by an operator; identifying a plurality of successive dissection curve points according to points of minimum intensity in successive image slices; and displaying the dissection curve that connects the identified plurality of successive dissection curve points.

A feature of the present invention is interaction with an operator to inform the imaging system of particular positions in unfolded regions to start the dissection operation.

Embodiments of the present invention, in a synergistic manner, desire to integrate skills of a human operator of the system with computer capabilities for tooth dissection. This takes advantage of human skills of creativity, use of heuristics, flexibility, and judgment, and combines these with computer advantages, such as speed of computation, capability for exhaustive and accurate processing, and reporting and data access capabilities.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The foregoing and other objects, features, and advantages of the invention will be apparent from the following more particular description of the embodiments of the invention, as illustrated in the accompanying drawings.

DETAILED DESCRIPTION OF THE INVENTION

Figure 1:
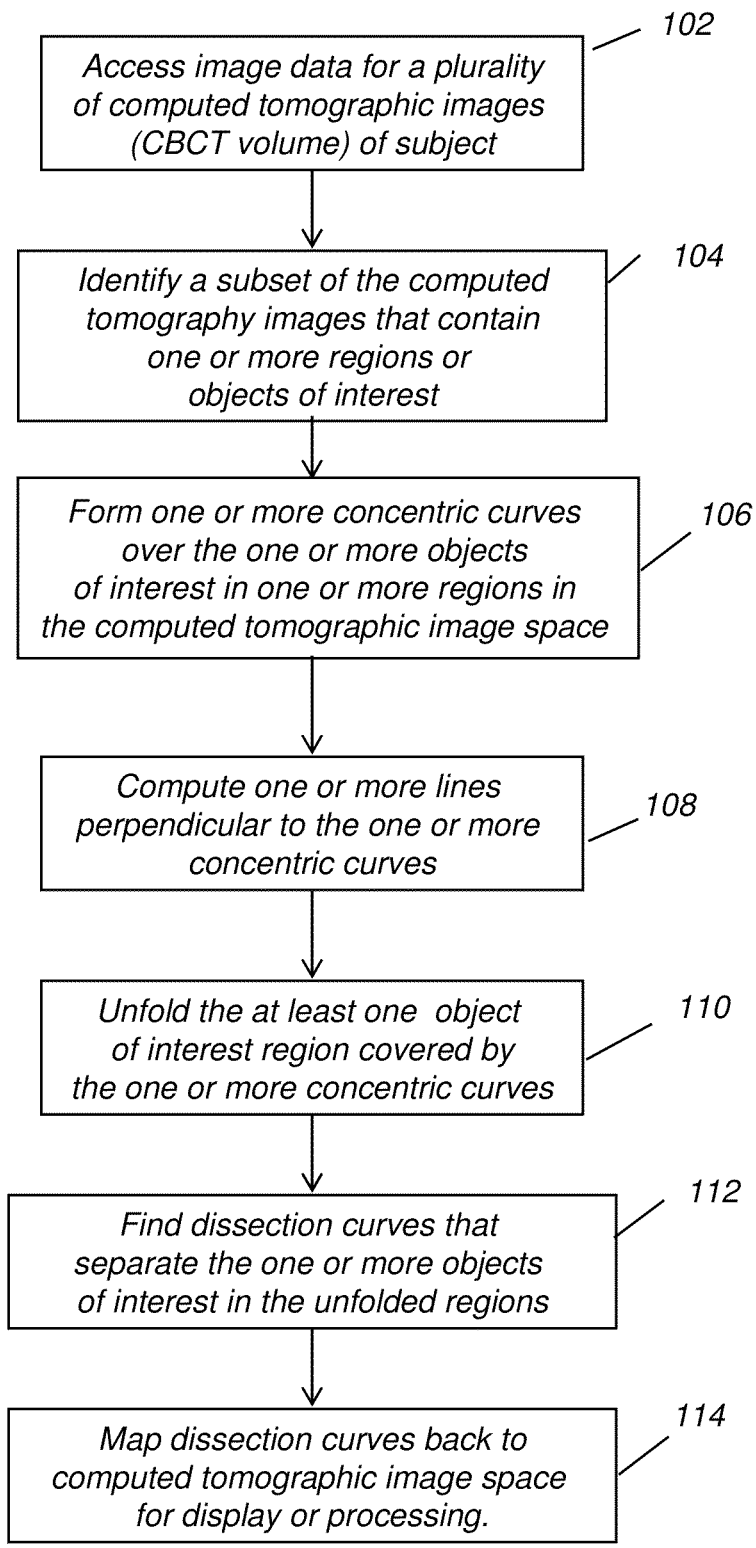
FIG. 1 is a logic flow diagram showing processes for forming one or more dissection curves according to an embodiment of the present invention.

This application is a Continuation-in-Part of commonly assigned copending U.S. patent application U.S. Ser. No. 13/187,596 filed on Jul. 21, 2011 entitled "METHOD AND SYSTEM FOR TOOTH SEGMENTATION IN DENTAL IMAGES" to Chen et al.

In the following detailed description of embodiments of the present invention, reference is made to the drawings in which the same reference numerals are assigned to identical elements in successive figures. It should be noted that these figures are provided to illustrate overall functions and relationships according to embodiments of the present invention and are not provided with intent to represent actual size or scale.

Where they are used, the terms "first", "second", "third", and so on, do not necessarily denote any ordinal or priority relation, but may be used for more clearly distinguishing one element or time interval from another.

In the context of the present disclosure, the term "image" refers to multi-dimensional image data that is composed of discrete image elements. For 2D (two-dimensional) images, the discrete image elements are picture elements, or pixels. For 3D (three-dimensional) images, the discrete image elements are volume image elements, or voxels.

In the context of the present disclosure, the term "code value" refers to the value that is associated with each volume image data element or voxel in the reconstructed 3D volume image. The code values for CT images are often, but not always, expressed in Hounsfield units.

In the context of the present disclosure, the term "geometric primitive" relates to an open or closed geometric figure or shape such as a triangle, rectangle, polygon, circle, ellipse, free-form shape, line, traced curve, or other traced pattern.

The term "highlighting" for a displayed feature has its conventional meaning as is understood to those skilled in the information and image display arts. In general, highlighting uses some form of localized display enhancement to attract the attention of the viewer. Highlighting a portion of an image, such as an individual organ, bone, or structure, or a path from one chamber to the next, for example, can be achieved in any of a number of ways, including, but not limited to, annotating, displaying a nearby or overlaying symbol, outlining or tracing, display in a different color or at a markedly different intensity or gray scale value than other image or information content, blinking or animation of a portion of a display, or display at higher sharpness or contrast.

In the context of the present invention, the descriptive term "high density object" generally indicates a mass, or object such as a tooth, that exceeds the density of the surrounding materials (such as soft tissues or air) and would be identified as a high density object by a skilled practitioner. Because of differences related to dosage, however, it is impractical to specify any type of absolute threshold for defining high density.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly included in set S and excludes at least one member of set S.

In the context of the present disclosure, the term "dissection" relates to methods used for separating one object from another, adjacent object. Thus, dissection of a subject tooth in an intraoral volume image defines a boundary between the subject tooth and an adjacent or neighboring tooth.

The subject matter of the present invention relates to digital image processing and computer vision technologies, which is understood to mean technologies that digitally process data from a digital image to recognize and thereby assign useful meaning to human-understandable objects, attributes or conditions, and then to utilize the results obtained in further processing of the digital image.

As noted earlier in the background section, conventional attempts at tooth segmentation have provided disappointing results and have not proved to be sufficiently robust for widespread application. Researchers Krsek et al. in the article cited earlier describe a method dealing with problems of 3D tissue reconstruction in stomatology, with 3D geometry models of teeth and jaw bones created based on input CT image data. The input discrete CT data were segmented by a largely automatic procedure with manual verification and correction. Creation of segmented tissue 3D geometry models was based on vectorization of input discrete data extended by smoothing and decimation. The actual segmentation operation was mainly based on selecting a threshold of Hounsfield Unit values, and proved to be less robust than needed for practical use.

Akhoondali et al. proposed a fast automatic method for the segmentation and visualization of teeth in multi-slice CT-scan data of the head in "Rapid Automatic Segmentation and Visualization of Teeth in CT-Scan Data", *Journal of Applied Sciences*, pp 2031-2044, (2009), cited previously. The algorithm that was employed consists of five main procedures. In the first part, the mandible and maxilla are separated using maximum intensity projection in the y direction and a step like region separation algorithm. In the second part, the dental region is separated using maximum intensity projection in the z direction, thresholding and cropping. In the third part, the teeth are rapidly segmented using a region growing algorithm based on four thresholds used to distinguish between seed points, teeth and non-tooth tissue. In the fourth part, the results are visualized using iso-surface extraction and surface and volume rendering. A semi-automatic method is also proposed for rapid metal artifact removal. However, in practice, it is very difficult to select a total of five different threshold values for a proper segmentation operation. Their published results show relatively poor dissection between the teeth.

In another attempt to resolve this problem, researchers Gao et al. disclosed a method to construct and visualize the individual tooth model from CT image sequences for dental diagnosis and treatment (see "Tooth Region Separation for Dental CT Images", *Proceedings of the* 2008 *Third International Conference on Convergence and Hybrid Information Technology*, pp 897-901, 2008), cited previously. Gao's method attempts to separate teeth for CT images where the teeth touch each other in some slices. The method finds the individual region for each tooth and separates two teeth if they touch. Their proposed method is based on distinguishing features of the oral cavity structure. The use of full 3D data, instead of 2D projections, may cause loss of some information. The described method initially separates upper and lower tooth regions and then fits the dental arch using fourth order polynomial curves, after a series of morphological operations. The method assumes that there exists a plane separating two adjacent teeth in 3D space. In this plane, the integral intensity value reaches a minimum. Along each arch point, this method obtains a plane and calculates the integral intensity. These values are then used to draw a profile. After analyzing all the local minima, this method obtains the separating point and the position of the separating plane. The information for the tooth region can guide the segmentation of both the individual tooth contours in 2D space and the tooth surfaces in 3D space. However, it appears that Gao's method may not actually separate (or dissect) the teeth correctly; the separation (dissection) lines in many cases cut through the teeth region of interest in certain slices.

Referring to the logic flow diagram of FIG. 1, there is shown a sequence of steps used for teeth dissection for a dental CBCT volume (accessed in an image access step 102) in one embodiment. A volume comprises image data for one or more images (or equivalently, slices). An original reconstructed CT volume is formed using standard reconstruction algorithms using multiple 2D projections or sinograms obtained from a CT scanner. Normally, only a fraction or subset of the images that form the volume include high density objects and is selected for processing; the rest of the CT reconstructed volume accurately represents soft tissue or air.

This selection of a subset of images for this procedure is done in an image selection step 104. A number of neighboring high density objects in an image (or slice) forms a region. A number of neighboring high density objects in another image (or slice) forms another region.

Figure 2:
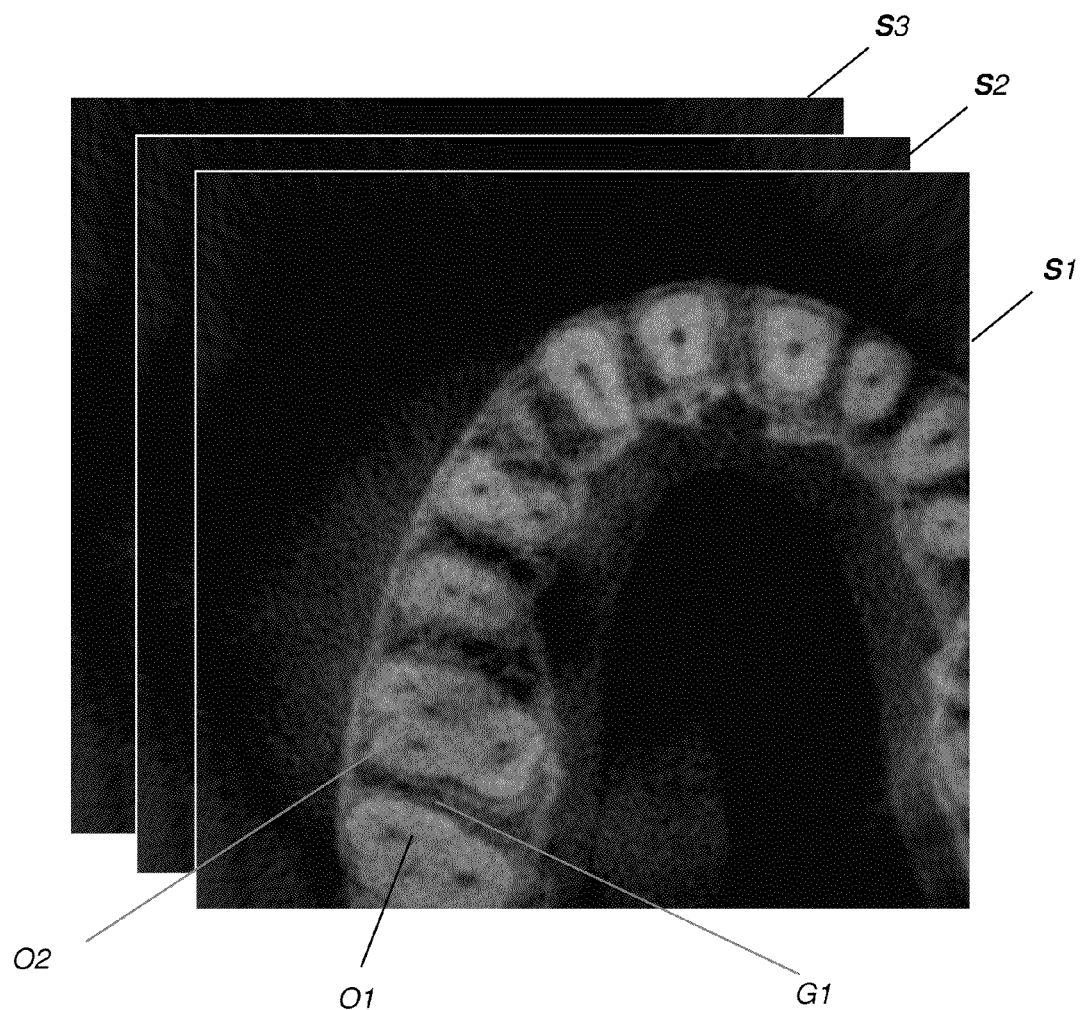
FIG. 2 is a view of a set of reconstructed CBCT images having objects of interest.

FIG. 2 shows an exemplary dental CBCT volume that includes three image slices S1, S2, and S3. High density object examples are objects O1 and O2 shown in slice S1; these are parts of two adjacent or neighboring teeth. High density objects including objects O1 and O2 in S1 constitute a region in S1. Similarly, high density objects like O1 and O2 in S2 constitute a region in S2. The same applies to S3.

There is a gap G1 between objects O1 and O2 in S1. The method of the present invention provides ways to identify a dissection curve that passes through gap G1, optionally following initial user input and conditions, including identification of appropriate regions, as described subsequently.

Figure 3A:
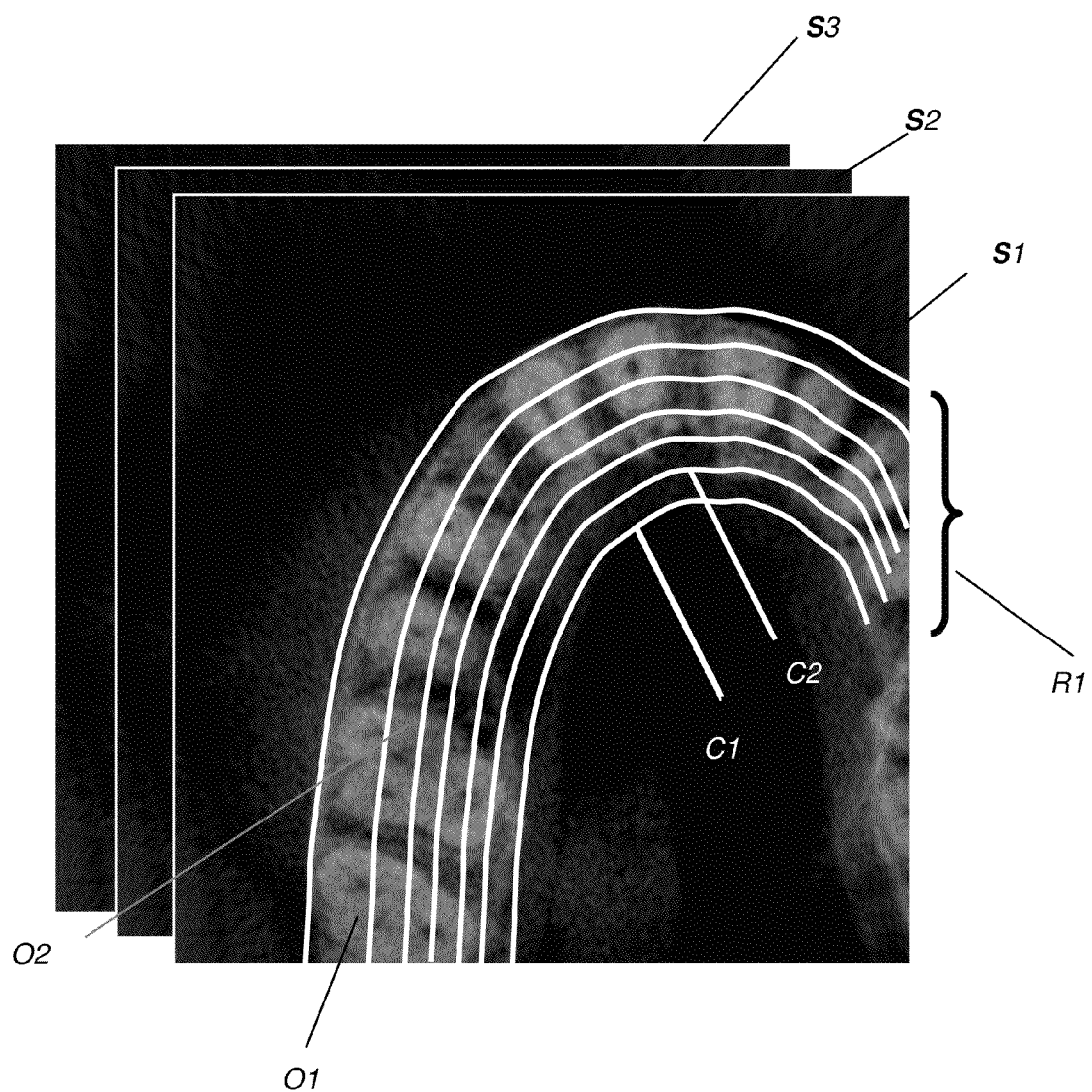
FIG. 3A is a view of a set of reconstructed CBCT images having features of interest with concentric curves overlaid.

In slice S1, the high density objects (teeth in this case) are collectively arranged in a geometric arch shape that can be decomposed into a set of concentric curves. FIG. 3A shows an exemplary set of concentric curves including curves C1 and C2 in slice S1. The requirement for forming a set of concentric curves is that these curves should cover (enclose) the region that is formed from the high density objects. An exemplary region R1 is shown in S1, encompassing the teeth in this slice. Similarly, a corresponding arch-shaped region, with corresponding curves, is formed for the region that comprises teeth in image slices S2 or S3.

Therefore, in a curve-forming step 106 of the FIG. 1 sequence, concentric curves are formed over the at least one object of interest. These curves are used for generating teeth dissection curves in the subsequent steps. Using these concentric curves in slice S1 and in corresponding regions in slices S2, S3, and other slices, a curved slab can be formed as a stack of these regions. The curved slab can then be cropped from the image volume.

Figure 3B:
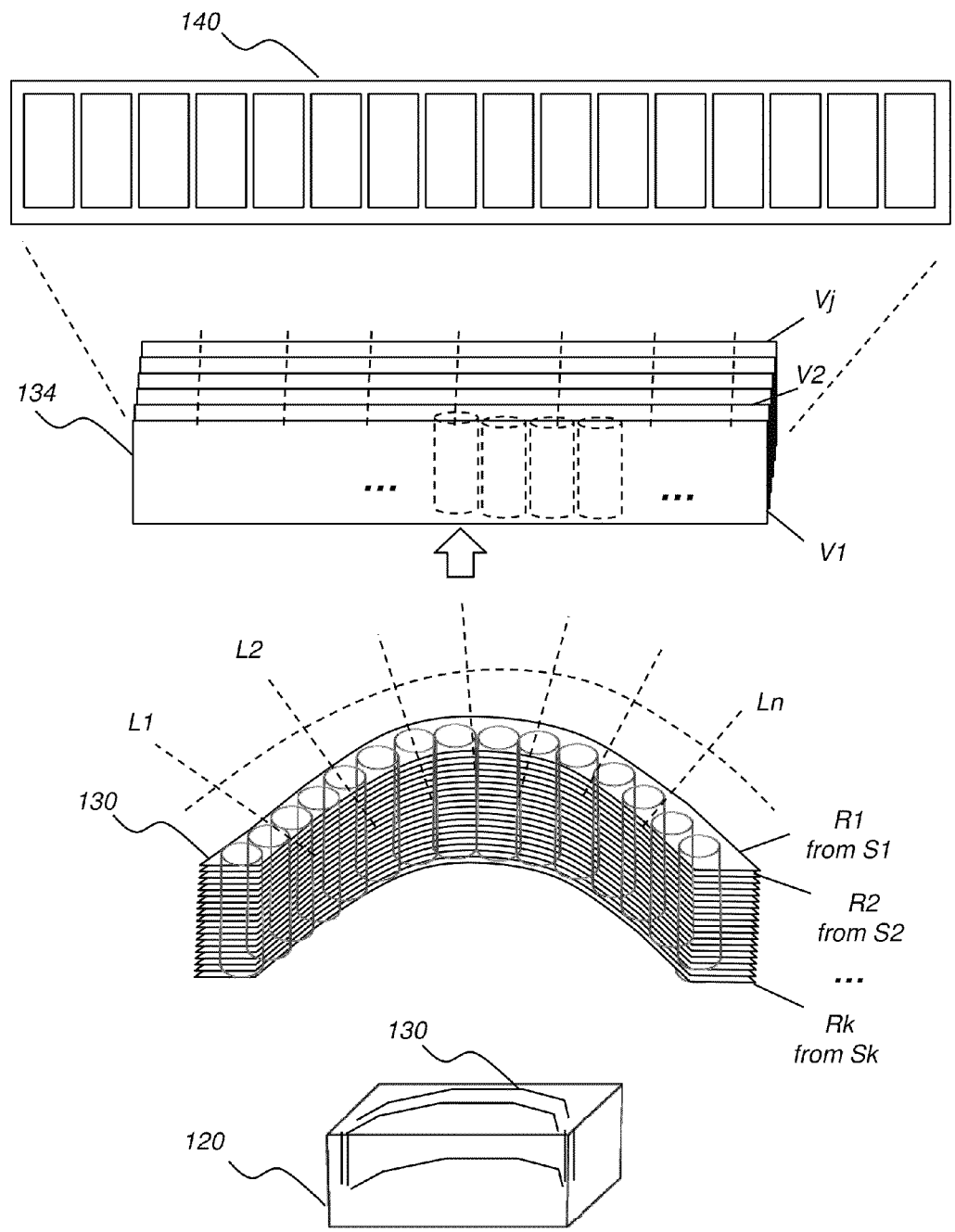
FIG. 3B is a schematic diagram that shows how a panoramic image is formed by unfolding a curved sub-volume.

As shown schematically in FIG. 3B, by stacking the regions that are defined along these concentric curves, that is, stacking of region R1 from slice S1 in FIG. 3A and corresponding regions R2, . . . Rk from slices S2, . . . Sk that would be defined in the same way, a curved slab can be formed as a curved sub-volume 130, including one or more of the features of interest, here, regions of one or more high density objects cropped from the larger image volume.

The diagram of FIG. 3B shows schematically how the segmentation sequence of the present invention proceeds to generate one or more panoramic views 140 from a dental CT volume 120. A first set of operations, through step 106 in FIG. 1, generates the curved slab of curved sub-volume 130, from the original CT volume 120. An unfold line computation step 108 then provides a utility that will be used subsequently for unfolding the curved sub-volume 130 along a selected curve to generate the desired flattened or unfolded panoramic view 140. In its effect, this maps the leaf of the foliation back to a plane, which can be readily manipulated and viewed as an image. As the sequence shown in FIG. 3B indicates, the curved sub-volume 130 is formed by stacking slices aligned generally along a first direction. Unfolding then operates in a planar direction that is orthogonal to this first direction, as shown in the view of an unfolded slab, termed an unfolded sub-volume 134. For unfolding, image data elements that lie along or nearby each fold line are re-aligned according to a realignment of the fold lines. This realignment generally aligns the fold lines from their generally radial arrangement to a substantially parallel orientation. Image data elements that were initially aligned with the fold lines in the original, generally radial arrangement follow the fold line re-orientation, effectively "flattening" the curved sub-volume with little or no distortion of the tooth and its position relative to other teeth.

Unfolded sub-volume 134 can be visualized as a stacked series of vertical slice images V1, V2, . . . Vj, as shown in FIG. 3B. Each vertical slice provides a panoramic image obtained at some depth within unfolded sub-volume 134. Subsequent steps then present the unfolded views to the user as a type of index to the volume that is to be assigned dissection lines. That is, selection from the unfolded view enables the user to provide hint (or seed) information that is used for dissection and, in most cases, subsequent segmentation of the tooth or other object.

The one or more concentric curves or curved paths in FIG. 3A could be traced using an automated approach or a semi-automatic approach. In an automated approach, slice S1 can be processed through a sequence of steps that include noise filtering, smoothing, intensity thresholding, binary morphological filtering, medial curve estimation, and pruning to identify a first curve that fits or approximates the arch shape of the teeth region. Subsequent concentric curves can then be defined using the shape and position of the first estimated curve as a starting point. These steps described are exemplary steps that are well known to those skilled in the art; other manual and automated processing steps could alternately be performed for providing a structure to support unfolding.

A semi-automatic approach can be simpler and more robust, without requiring an elaborate operator interface. For such an approach, user input initializes a few nodes along an imaginary medial axis of the arch shape region in slice S1 (FIGS. 3A, 3B), for example. These few nodes then become starting points for a curve-fitting algorithm, such as a spline-fitting sequence, for example, to form a first curve that fits the arch shape of the teeth region. Subsequent concentric curves can then be generated using the first estimated curve. Steps for operator-assisted curve definition and generation of parallel or otherwise related curves are familiar to those skilled in the image analysis arts.

Once the concentric curves are formed in step 106 (FIG. 1), computation step 108 computes lines that are generally perpendicular to the concentric curves in the tomographic image space. These perpendicular lines facilitate finding dissection lines between the teeth in subsequent processing. Exemplary perpendicular lines are shown as unfold lines L1 and L2 in FIG. 4. It is readily understood that two neighboring perpendicular lines could touch or intersect at one end but be spaced apart at the other end by examining the exemplary perpendicular lines in slice S1 in FIG. 4.

In an unfolding step 110 (FIG. 1) the curved slab including one or more of the regions of one or more high density objects is unfolded with the help of the computed lines that are perpendicular to the concentric curves.

Figure 4:
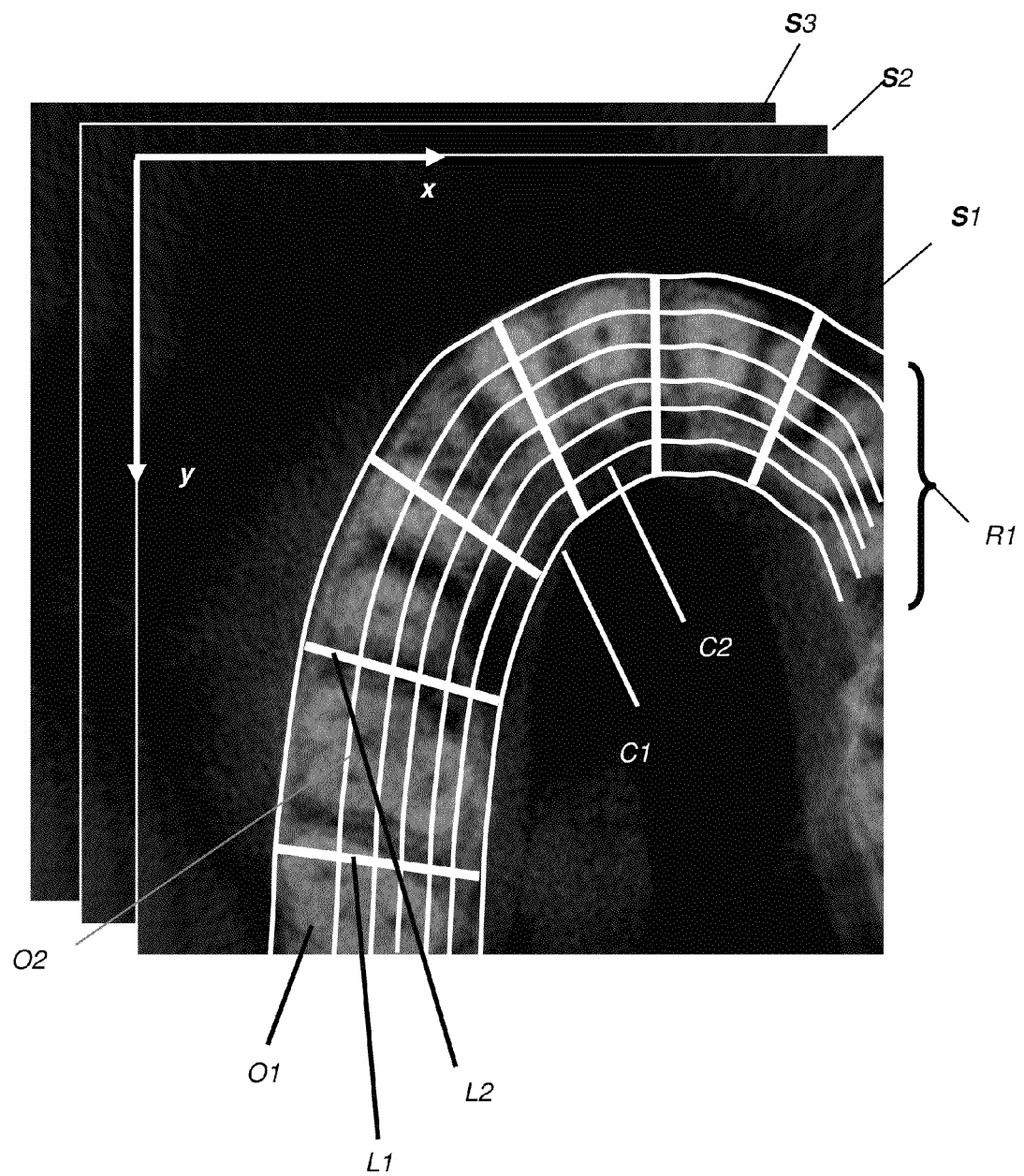
FIG. 4 is a view of a set of reconstructed CBCT images having objects of interest with concentric curves and lines for unfolding formed perpendicular to the concentric curves overlaid.
Figure 5A:
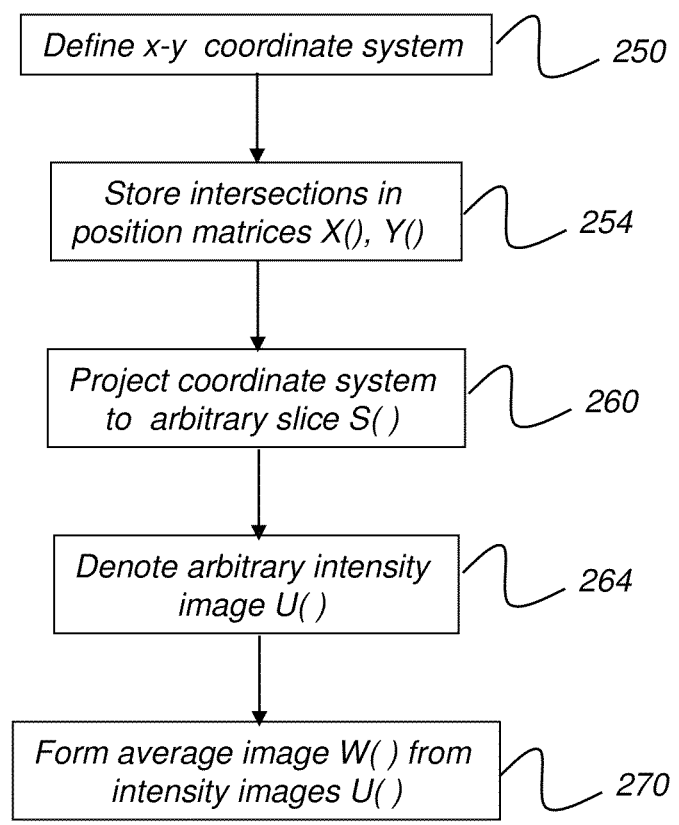
FIG. 5A is a logic flow diagram that shows a sequence of steps for forming an averaged image W from a number of intensity images.

The logic flow diagram of FIG. 5A shows the sequence for unfolding the curved slab according to an embodiment of the present invention. In a definition step 250, an x-y coordinate system for slice S1, as shown in FIG. 4, is defined. The origin is at the upper left corner of slice S1. Suppose there are a total of M concentric curves (C1, C2, ... Cm, ... CM), and a total of N perpendicular lines (L1, L2, ... Ln, ... LN). An x position matrix of size of M by N is denoted by X. A y position matrix of size of M by N is denoted by Y. A storage step 254 stores the x position of an intersection point of Cm and Ln at matrix X(m,n). The y position of an intersection point of Cm and Ln is stored at matrix Y(m,n). In a slice assignment step 260, an arbitrary slice S is denoted with the same x-y coordinate system defined in definition step 250 and shown in FIG. 4.

Continuing with the FIG. 5A sequence, in an intensity image step 264 an arbitrary intensity image by U of size of M by N is generated. Define: $U(m,n)=S(Y(m,n), X(m,n))$.

Therefore, for a specific slice, a series of intensity images are generated:

$$U1(m,n)=S1(Y(m,n),X(m,n))$$

$$U2(m,n)=S2(Y(m,n),X(m,n))$$

$$U3(m,n)=S3(Y(m,n),X(m,n)), \text{etc.}$$

Collectively, the intensity images U1, U2, U3, etc. formed in this way constitute an unfolded curved slab. Then, in an average image step 270 (FIG. 5A), having the unfolded curved slab ready, computing an averaged image W of the unfolded curved slab in the axial direction yields:

$$W=(U1+U2+U3+\ldots+UK)/K,$$

where K is the number of slices included in the unfolded curved slab.

Figure 5B:
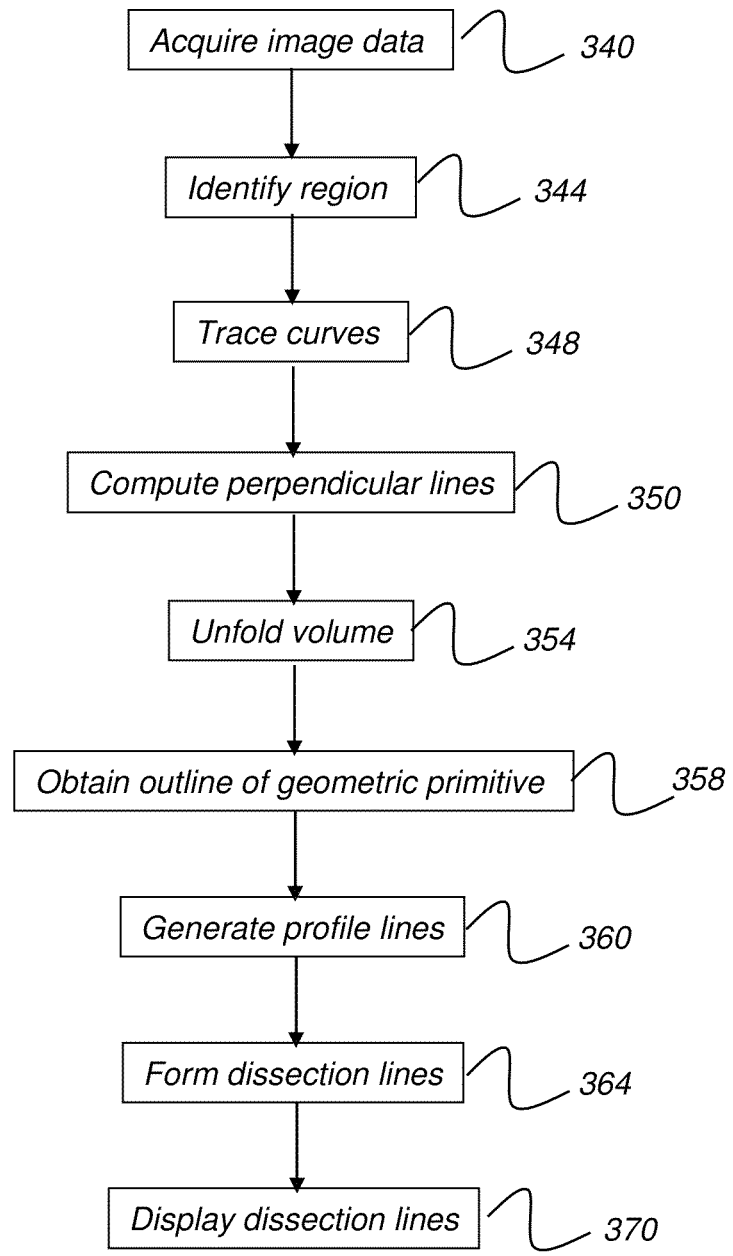
FIG. 5B is a logic flow diagram that shows a sequence of steps for generating and displaying a dissection line between a first and a second object in a volume image.
Figure 5C:
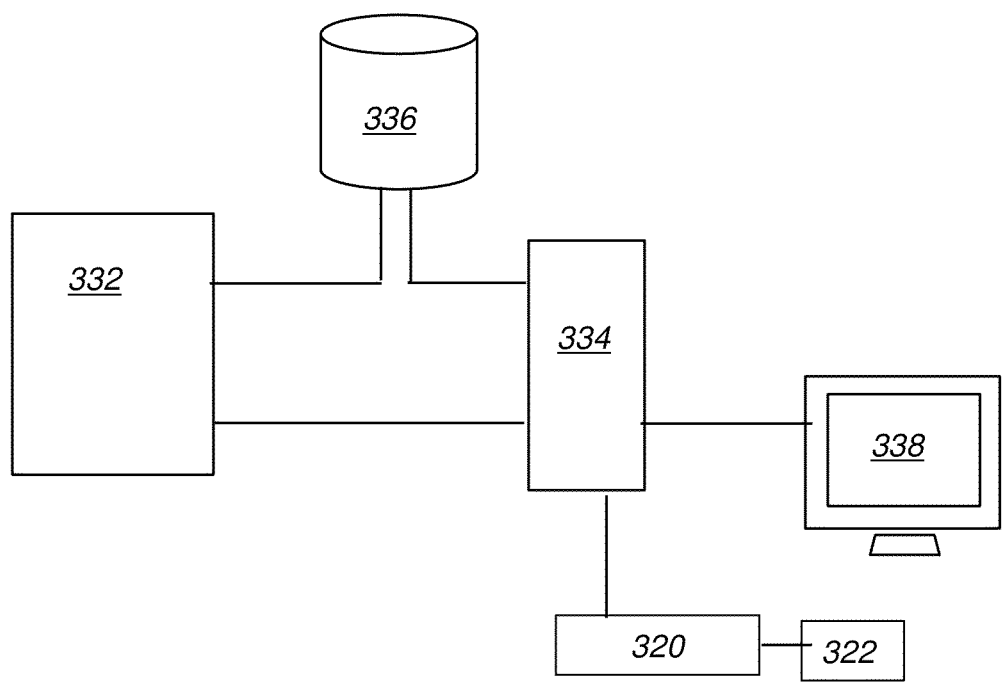
FIG. 5C shows an imaging apparatus that is used for forming one or more dissection curves.

FIG. 5B is a logic flow diagram that shows a sequence of steps for generating and displaying a dissection line between a first and a second object, such as between two teeth, in a volume image. FIG. 5C shows an imaging apparatus 330 that is used for the steps shown in FIG. 5B. Imaging apparatus 330 has an image acquisition apparatus 332 such as a CBCT imaging system, for example, that provides the volume image of the patient. The volume image data may be obtained directly from image acquisition apparatus 332 or from a memory 336 or other storage system, such as a PACS (picture archiving and communication system) or other system that stores the acquired image data. Imaging apparatus 330 has a computer system or other logic processor 334 with a display console 338 that provides both display and operator interface functions, such as through a keyboard 320 and mouse 322 or incorporating a touch screen, for example. In an image acquisition step 340, the volume image data of the patient or other subject is acquired from memory 336 or other source.

Continuing with the FIG. 5B sequence, a region identification step 344 then identifies the region of the volume image that comprises at least the first and second teeth or other objects. A curve tracing step 348 then forms one or more concentric curves over at least the first and second objects in the region according to the volume image data. A computation step 350 then computes one or more lines perpendicular to the one or more concentric curves. An unfolding step 354 unfolds the region covered by the one or more concentric curves to generate an unfolded view of the region. An obtain outline step 358 obtains an outline of a geometric primitive that is traced with respect to the first object in the unfolded region, based on operator input. Entry of a geometric primitive by the operator is described in more detail subsequently. A profile line generation step 360 then generates a plurality of profile lines across the first and second objects using information obtained from the outline of the geometric primitive that is obtained in step 358. Gap points in each profile line are then identified and joined together in a dissection line forming step 364. Dissection lines are then displayed relative to the volume image in a display step 370.

Figure 6A:
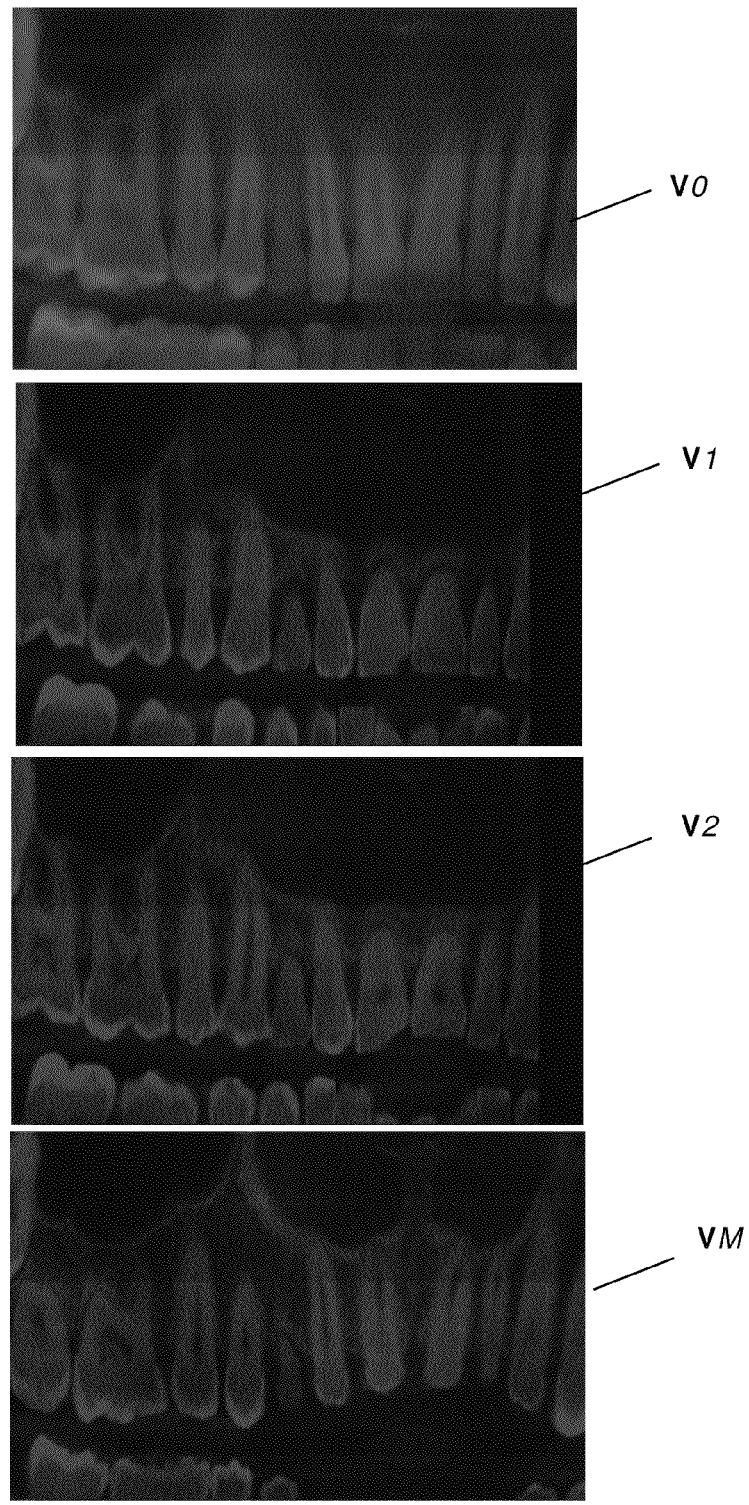
FIG. 6A shows different views of a volume image.

FIGS. 6A through 6D show various features of the process and show how the geometric primitive that is entered by the operator is used to provide starting points for tooth dissection. FIG. 6A shows views V0-VM for different unfolded views of the teeth. View V0 is the averaged view that is obtained using the data in each slice V1-VM. Slices V1, V2, and VM are individual coronal view slices, generated as was described earlier with reference to FIG. 3B. Although a geometric primitive can be traced onto any one or more of the individual slices of views V1-VM, it is generally preferable to have the operator trace a geometric primitive onto the averaged view V0. Although the operator can trace the geometric primitive onto any view of the unfolded volume image, the coronal view is advantaged for ease of visualization and usability.

Figure 6B:
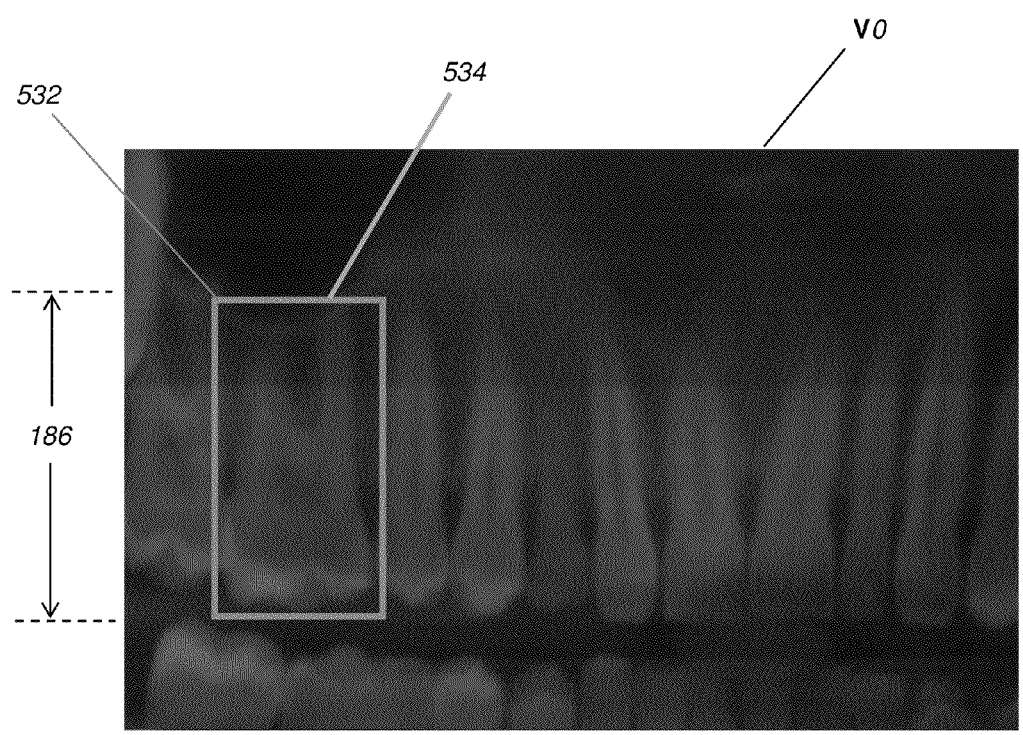
FIG. 6B shows a volume image with an outlined tooth, obtained from user interface input.

FIG. 6B shows operator entry of a box 532 as one type of geometric primitive 534 that helps to identify starting points for tooth dissection. Box 532 can be readily entered with a computer mouse in one action, using standard drag-and-hold procedure to define diagonal corners, for example. The geometric primitive that is entered defines a height 186 and edges for providing start points for dissection processing. The height that is defined helps to limit the amount of data that is processed in subsequent steps, so that volume image data outside of the region of the teeth or other objects can be ignored for this purpose. Alternate types of geometric primitive include points, lines, circles, or free-form closed or open figures or shapes, for example.

Figure 6C:
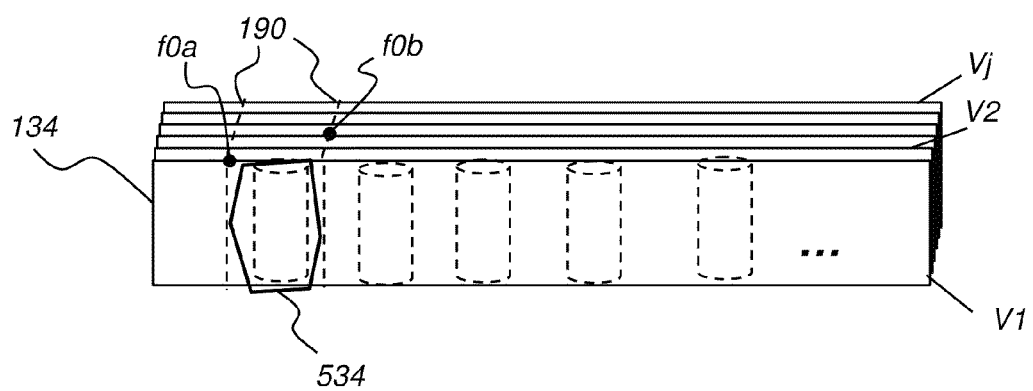
FIG. 6C is schematic diagram of a perspective view of vertical (coronal) slices.

The schematic diagram of FIG. 6C shows, from a perspective view of vertical (coronal) slices V1-Vj, how edges of the geometric primitive 534 are used. Extreme edges or sides of geometric primitive 534 are extended to define extended lines 190 that can be used to identify starting points f0a and f0b for each vertical slice V1-Vj. Starting point f0a is shown on the first slice V1; starting point f0b is shown in the middle of the stack of coronal slices. In practice, the starting points can be identified at any point along the extended line 190, that is, in reference to the designations shown in FIG. 6C, in the image data corresponding to any of vertical slices V1-Vj.

Figure 6D:
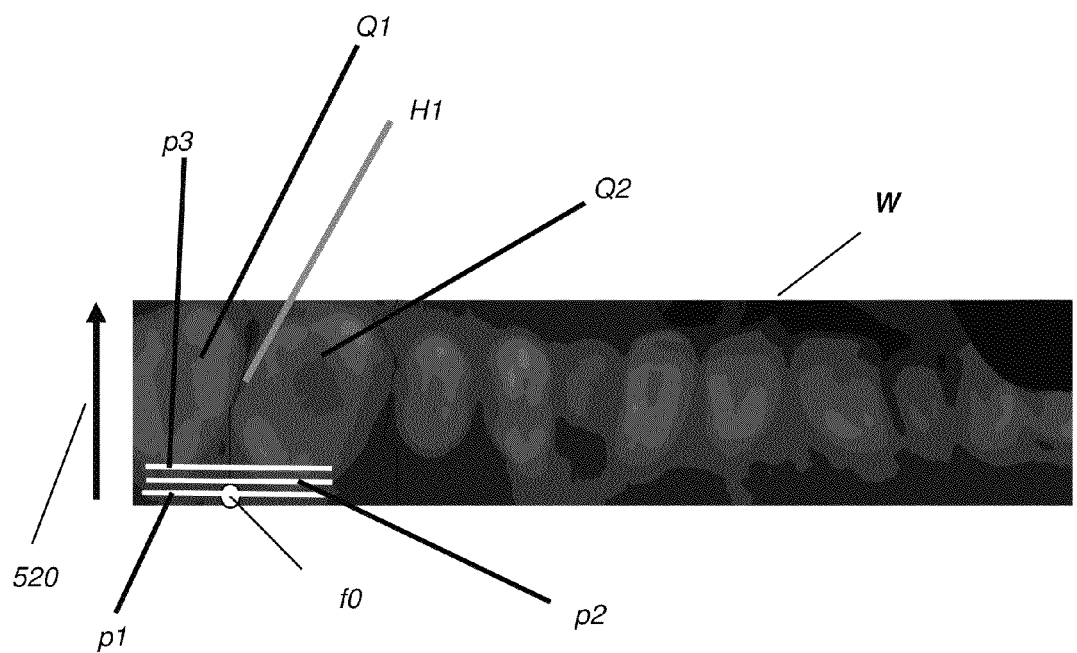
FIG. 6D is an image that shows the use of profile lines for analyzing the gap between teeth and generating a dissection line.

FIG. 6D shows an axial view averaged image W corresponding to the coronal view schematic of FIG. 6C. Image W has size M by N pixels. In unfolded FIG. 6D, the high density objects (teeth) are aligned approximately along a horizontal direction instead of along a curved medial axis as was shown in FIG. 2. Lines drawn in the horizontal direction correspond to the top edges of slices V1-Vj in FIG. 6C. Three representative profile lines p1, p2, and p3 are indicated for a number of the slices in this view.

The unfolding operation of the curved slab, as described earlier with reference to FIG. 3B, makes it possible to trace dissection lines between the teeth in a more straightforward manner, as described in more detail later. Objects O1 and O2 in FIG. 2 correspond to objects Q1 and Q2 in FIG. 6D; the shape of either O1 or O2 may be transformed to Q1 and Q2 due to the unfolding operation. A gap G1 between O1 and O2 in FIG. 2 now appears as gap H1 in the unfolded view of FIG. 6D. Given these transformations, the task of automatically finding a dissection curve that passes through gap G1, with or without an initial condition imposed by the user, then becomes the task of finding a dissection curve that passes through gap H1. This task is then more easily accomplished by searching along the same direction indicated by an arrow 520 for each pair of teeth in image W in FIG. 6D.

With reference to the sequence of FIG. 1, identifying the dissection line between two teeth in image W is carried out in a line identification step 112 by identifying points of minimum intensity, or valley points along profile lines. As noted with respect to FIGS. 6C and 6D, profile lines correspond to the top edges of each vertical slice (viewed along the top in the perspective view of FIG. 6C and from the top in the plan view of FIG. 6D.) A point of minimum intensity corresponds to an image element, voxel or pixel, at a position in the image data. The use of profile lines is a convenience and helps to visualize the direction in which processing progresses in order to identify the succession of valley points needed to define the dissection line.

Figure 7A:
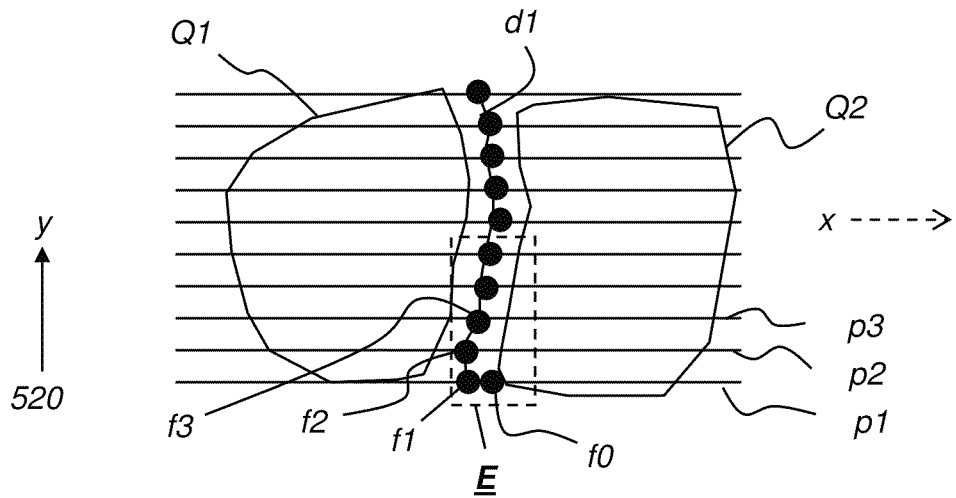
FIG. 7A is a plan view that shows how valley points are used to generate a dissection line.
Figure 7B:
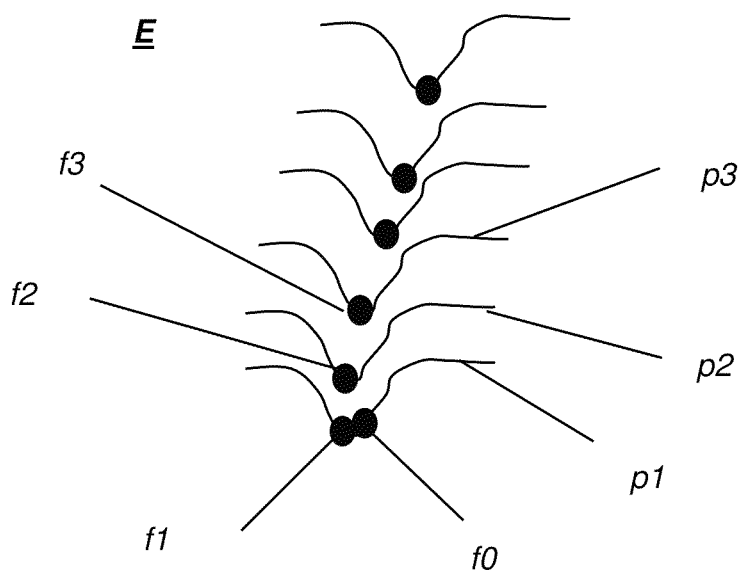
FIG. 7B is a schematic diagram in perspective, illustrating finding valleys on profile lines in the average image of an unfolded curved slab.

FIGS. 7A and 7B show, in schematic form, how the dissection curve d1 between objects Q1 and Q2 is formed by connecting points in an incremental fashion. FIG. 7A is a plan view, showing multiple profile lines p1, p2, p3, and so on. FIG. 7B shows, from a perspective view, how profile lines within a section identified as inset E in FIG. 7A, provide valley points f1, f2, f3, and so on. An initial starting point f0 is identified from an edge of a geometric primitive traced by the operator, as was described earlier with reference to FIGS. 6B-6D. In the example shown, analysis of the image data along profile line p1 indicates that a nearby point f1 is a more suitable valley point and is thus substituted for f0 as the effective starting point for forming dissection line d1. Then, progressing from point f1 in the direction of arrow 520 (the y direction) and searching along the next profile line p2, the next valley point f2 is identified. According to an embodiment of the present invention, a constraint is imposed on how far the next valley point can be displaced in the +/−x-direction (orthogonal to arrow 520, as shown in FIG. 7A) with each step in the y direction. This constraint is in the x direction that is substantially orthogonal to the path of the dissection curve at any valley point. According to an exemplary embodiment of the present invention, in moving in the y direction from one profile line to the next, the x-coordinate of the next valley point must be within +/−6 voxels (or pixels) of the x-coordinate for the preceding valley point that has been identified. It can be appreciated that this constraint value helps to prevent abrupt changes in the overall direction of the dissection curve and can be adjusted appropriately for controlling the path of the dissection curve.

The process repeats until all the profile lines pn are searched. The collection of valley points including f1, f2 and f3 are connected to form a dissection line d1 that separates teeth Q1 and Q2 or other adjacent objects. In the same manner, a dissection line on the other side of a tooth is similarly generated. The process repeats as often as needed until all needed pairs of teeth are equipped with dissection lines.

Figure 8:
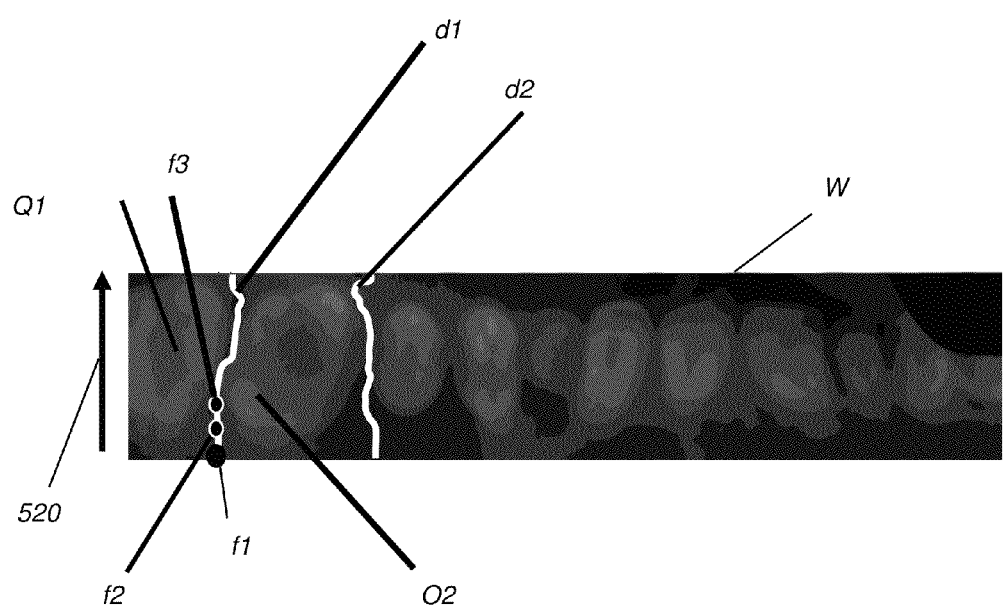
FIG. 8 is an average image of an unfolded curved slab with the identified dissection lines overlaid.
Figure 9:
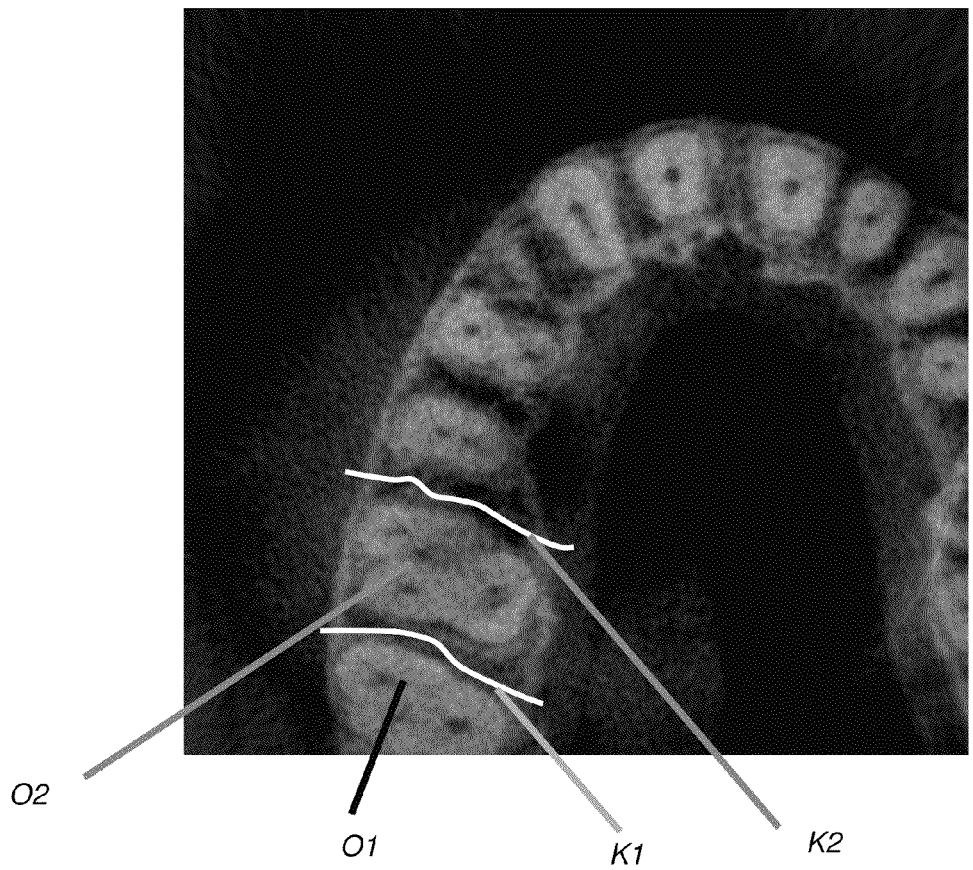
FIG. 9 is a view of a reconstructed CBCT image having dissection lines mapped between the objects of interest.

Referring to FIG. 1, a mapping step 114 maps the dissection curves back to the computed tomographic image space as shown in FIGS. 8 and 9. FIG. 8 is the unfolded view of averaged image W. FIG. 9 is a view of a reconstructed CBCT volume image having dissection curves K1 and K2 mapped between the objects of interest. Recalling the definitions of $X(m,n)$ and $Y(m,n)$ that are stated previously, a vector $(m,n)$ can be readily mapped to $(Y(m,n), X(m,n))$ in the computed tomographic image space. A pair of dissection curves d1 and d2 in FIG. 8 correspond to curves K1 and K2 in FIG. 9. These mapped dissection curves can then be displayed on a control monitor associated with the computer logic processor or other processor that executes the procedures described herein. Dissection curves can be displayed in a 2D or 3D rendering of the associated image data. In a volume rendering, a dissection curve can be viewed from any suitable angle.

Embodiments of the present invention provide a practical teeth dissection curve finding system that synergistically integrates the skills of the human operator of the system with the power of the computer in the process of tooth dissection. This takes advantage of human skills of creativity, use of heuristics, flexibility, and judgment, and combines these with computer advantages, such as speed of computation, capability for exhaustive and accurate processing, reporting and data access and storage capabilities, and display flexibility.

In one embodiment, the present invention employs a computer program with stored instructions that perform metal artifacts reduction on image data accessed from an electronic memory in accordance with the method described. As can be appreciated by those skilled in the image processing arts, a computer program of an embodiment of the present invention can be utilized by a suitable, general-purpose computer system, such as a personal computer or workstation. However, many other types of computer systems can be used to execute the computer program of the present invention, including networked processors. The computer program for performing the method of the present invention may be stored in a computer readable storage medium. This medium may comprise, for example; magnetic storage media such as a magnetic disk (such as a hard drive) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other communication medium. Those skilled in the art will readily recognize that the equivalent of such a computer program product may also be constructed in hardware.

It is noted that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The invention has been described in detail with particular reference to presently preferred embodiments, but it will be understood that variations and modifications can be effected that are within the scope of the invention. For example, the geometric primitive entered by the operator may have a default shape, such as a rectangle of a predefined size. Placement of the geometric primitive on the image display may be performed using gaze tracking or other mechanism, or may use a touch screen, or a pointer such as a computer mouse device. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method of generating a dissection curve between a first and a second object in a volume image, the method executed at least in part on a computer, comprising:
   accessing volume image data of a subject as a set of image slices;
   identifying a region of the volume image data that comprises at least the first and second objects;
   defining one starting point in the volume image data for the dissection curve according to a geometric primitive;
   from the one starting point, identifying a plurality of successive dissection curve points that are points of minimum intensity in successive image slices; and
   displaying the dissection curve that connects the identified plurality of successive dissection curve points.

2. The method of claim 1 wherein accessing the volume image data comprises obtaining data from a picture archival system.

3. The method of claim 1 wherein accessing the volume image data comprises obtaining cone beam computed tomography data.

4. The method of claim 1 wherein the geometric primitive is a rectangle defined by the operator that encompasses the first or the second object in one view of the volume image.

5. The method of claim 1 wherein the geometric primitive is identified by an operator using a touch screen.

6. The method of claim 1 wherein the geometric primitive is entered by an operator on an unfolded coronal view of a dental arch and wherein the points of minimum intensity are determined relative to an axial view of the dental arch.

7. The method of claim 1 further comprising transforming the accessed volume image data to flatten the shape of a dental arch.

8. The method of claim 1 wherein defining the at least one starting point comprises determining the edge of the entered geometric primitive.

9. The method of claim 1 wherein identifying the plurality of successive dissection curve points comprises applying a dimensional constraint in a direction that is substantially orthogonal to the dissection curve.

10. A method of generating a dissection curve between a first and a second tooth in a volume image, the method executed at least in part on a computer, comprising:
    accessing volume image data of a dental arch of a patient as a set of image slices;
    transforming the volume image data to display the dental arch as an unfolded image;
    identifying a region of the transformed volume image data that comprises at least the first and second teeth;
    defining at least one starting point in the volume image data for the dissection curve according to a geometric primitive;
    from the at least one starting point, identifying a plurality of successive dissection curve points according to points of minimum intensity in successive image slices, wherein the points of minimum intensity correspond to gaps between the teeth; and
    displaying the dissection curve that connects the identified plurality of successive dissection curve points between the teeth.

11. The method of claim 10 wherein the geometric primitive is a closed shape that encompasses a view of the first or second object in the volume image.

12. The method of claim 10 wherein displaying the dissection curve comprises displaying the dissection curve in a display of the volume image.

13. A method of generating a dissection curve between a first and a second tooth in a volume image, the method executed at least in part on a computer, comprising:
    accessing volume image data of a dental arch of a patient as a set of image slices from a cone beam computed tomography system;
    transforming the volume image data to display the dental arch as an unfolded image;
    identifying a region of the transformed volume image data that comprises at least the first and second teeth;
    defining at least one starting point in a first slice of the volume image data for the dissection curve according to a geometric primitive defined by an operator on a coronal view of the dental arch;
    from the at least one starting point, identifying one or more dissection curve points in successive slices of the volume image data, wherein the dissection curve points correspond to image data elements of minimum intensity between the first and second teeth in their respective slices,
    forming the dissection curve that connects the identified one or more successive dissection curve points between the teeth; and
    displaying the dissection curve with the volume image.

14. The method of claim 13 wherein the geometric primitive is a rectangle defined by the operator that encompasses the first or the second object in one view of the volume image.

15. The method of claim 13 wherein defining the at least one starting point comprises determining an edge of the entered geometric primitive.

* * * * *